US006656722B1

United States Patent
Ruitenberg et al.

(10) Patent No.: US 6,656,722 B1
(45) Date of Patent: Dec. 2, 2003

(54) PROCESS FOR IMMOBILIZING ARSENIC WASTE

(75) Inventors: Renate Ruitenberg, Sneek (NL); Cees Jan Nico Buisman, Harich (NL)

(73) Assignee: Paques Bio Systems B.V., Balk (NL)

( * ) Notice: Subject to any disclaimer, the term of this patent is extended or adjusted under 35 U.S.C. 154(b) by 15 days.

(21) Appl. No.: 10/018,995

(22) PCT Filed: Jun. 22, 2000

(86) PCT No.: PCT/NL00/00434

§ 371 (c)(1),
(2), (4) Date: Dec. 26, 2001

(87) PCT Pub. No.: WO00/78402

PCT Pub. Date: Dec. 28, 2000

(30) Foreign Application Priority Data

Jun. 22, 1999 (EP) ............................................ 99202005

(51) Int. Cl.⁷ ................................................ C12S 13/00
(52) U.S. Cl. ............ 435/262.5; 210/610; 423/DIG. 17; 75/711
(58) Field of Search ............................. 435/262, 262.5; 210/610, 611; 423/87, DIG. 17; 75/711, 710, 743

(56) References Cited

U.S. PATENT DOCUMENTS

| 2,686,114 A | * | 8/1954 | McGauley et al. ............ 423/35 |
| 4,439,407 A | * | 3/1984 | Parks .......................... 423/317 |
| 4,822,413 A |   | 4/1989 | Pooley et al. |
| 4,888,293 A |   | 12/1989 | Hackl et al. |
| 5,246,486 A | * | 9/1993 | Brierley et al. ................ 75/743 |
| 5,429,659 A | * | 7/1995 | Spencer et al. ................ 75/711 |
| 6,207,443 B1 | * | 3/2001 | King ............................ 435/262 |

FOREIGN PATENT DOCUMENTS

| EP | 737650 A2 | * 10/1996 | ............. C02F/1/62 |
| JP | 63 278593 | 11/1988 | |
| RU | 2 089 637 | 9/1997 | |
| WO | WO 97/05292 | 2/1997 | |

* cited by examiner

Primary Examiner—William H. Beisner
(74) Attorney, Agent, or Firm—Young & Thompson

(57) ABSTRACT

The invention provides a process for removing and immobilizing arsenic from an arsenic-containing waste. It comprises oxidizing the arsenic to pentavalent arsenic in an aqueous medium, contacting the pentavalent arsenic with trivalent iron to form an insoluble iron-arsenic compound and separating precipitated iron-arsenic compound from the aqueous medium. The oxidation of arsenic is effected using oxidizing bacteria at a pH between 0.5 and 4 and at a temperature between 20 and 90° C. in the presence of a mineral catalyst such as pyrite.

16 Claims, 1 Drawing Sheet

PROCESS FOR IMMOBILIZING ARSENIC WASTE

CROSS REFERENCE TO RELATED APPLICATION

This is the 35 USC national stage of International Application PCT/NL00/00434 filed on Jun. 22, 2000.

FIELD OF THE INVENTION

The present invention relates to a process for immobilizing arsenic ions comprising oxidizing arsenic to pentavalent arsenic and supplying trivalent iron, and subsequently immobilizing the pentavalent arsenic as an iron arsenate.

BACKGROUND OF THE INVENTION

Arsenic is an important and unwanted by-product in many metallurgical processes. For example, copper ores contain a substantial amount of arsenic, which is undesired for health and environmental reasons and must therefore be separated from the copper metal and be safely disposed of In pyrometallurgic processes, arsenic is usually separated from off-gas and converted to arsenic trioxide ($As_2O_3$). This trivalent arsenic compound is unstable, since arsenic is slowly oxidised to pentavalent arsenic. Where there is no use for such arsenic trioxide, it should be carefully deposited so as to avoid leaching of arsenic to the aquatic environment.

A conventional method for separating and disposing arsenic form metallurgical process streams involves chemical oxidation of the arsenic-containing liquid, which also contains iron, in an oxygenated autoclave at about 90° C. at pH 3–4. The pentavalent arsenic thus produced is then converted to a stable insoluble ferric arsenate typically having a molar Fe/As ratio of at least 4 (see e.g. G. B. Harris, "The Control and Disposal of Arsenic in Hydrometallurgical Systems", 24th Annual CIM Hydro-metallurgical Conference, Toronto, Ontario, Aug. 20–21, 1994). This chemical oxidation using autoclaves is expensive because of the use of expensive equipment and chemicals, and because of high training costs to avoid personal hazard.

U.S. Pat. No. 4,888,293 discloses a process wherein a mixture of pyrite and arsenopyrite with a molar Fe/As ratio of about 4:1 is treated with a mixed culture of *Thiobacillus ferrooxidans, T thiooxidans* and *Leptospirillum ferrooxidans* resulting in a strongly acidic (pH 1.1) solution. This solution is neutralised and produces a precipitate containing iron arsenate and jarosite, having an Fe/As ratio in the order of 8.

SUMMARY OF THE INVENTION

A new process for the immobilisation of arsenic has been found, involving biological oxidation of arsenic to pentavalent arsenic as well as supply of trivalent iron, in particular by biological oxidation of scrap iron. This oxidation results in effective oxidative solubilisation of the metals followed by effective disposal of the arsenic. The process is defined in the appending claims.

The oxidation of trivalent arsenic in the presence of iron is carried out using suitable oxidizing bacteria. In general, these bacteria assist in the oxidation of divalent iron to trivalent iron using oxygen and acid (protons). Suitable bacteria are usually present in the raw materials (ores) from which the arsenic waste originates. Suitable bacteria can also be derived form other biological, aerobic waste treatment plants. The bacteria capable of oxidizing iron and arsenic will normally spontaneously become dominant as a result of the process conditions which can be selected by the skilled person. The bacteria can be heterotrophic such as soil bacteria of the genera Pseudomonas, Achromobacter, Bacillus (especially *B. cereus*) and Alcaligenes (especially *A. faecalis*). It is preferred, however, that the bacteria are autotrophic bacteria, as these do not need other carbon sources than carbon dioxide, which may be present in sufficient amounts in the waste to be treated, e.g. in the form of carbonates ($FeCO_3$) or with the air supplied to the oxidation process. Suitable autotrophic bacteria for oxidizing sulphur and/or iron species include mesophilic bacteria, in particular Thiobacillus species such as *T. ferrooxidans* and *T. thiooxidans* and Leptospirillum species including *L. ferrooxidans*, moderately thermophilic bacteria, in particular Acidomicrobium, Sulfobacillus and Thiobacillus species and extremely thermophilic bacteria, in particular Sulpholobus and Acidiamus species such as *S. acidocaldarius*. Mesophiles are typically active at temperatures from about 20° C. to about 45° C., moderate thermophiles at about 45 to 65° C. and extreme thermophiles at between about 65 and 90° C.

The biological oxidation is carried out at a pH between 0.5 and 4, especially between 1 and 3, at a temperature (depending on the type of bacteria used) between ambient temperature and about 85° C. or even up to 90° C. A process using mesophilic bacteria is preferably operated at 30 to 45° C., while a process using thermophilic bacteria is preferably performed at 50 to 80° C. Hyperthermophilic bacteria capable of activity between about 75 and 90° C., which can be isolated from hot pools and other hot water sources, can be used according to the invention at those high temperatures. The biological oxidation of arsenic usually requires the presence of a mineral catalyst, in particular a (semi-) noble metal or a metal or metal complex in the galvanic series from noble metals downwards to complexes comparable to pyrite-type minerals. The latter include pyrite, chalcopyrite and molybdenite. The catalyst should have a clean surface.

The reaction for oxidative arsenic trioxide dissolution by ferric ion can be represented by the following equation:

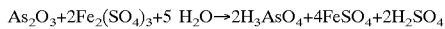
$$As_2O_3 + 2Fe_2(SO_4)_3 + 5\ H_2O \rightarrow 2H_3AsO_4 + 4FeSO_4 + 2H_2SO_4$$

The ferric ion is regenerated by the bacteria using oxygen, so that the net reaction is conversion of $As_2O_3$ with oxygen and water to $H_3AsO_4$.

The trivalent iron necessary for producing the insoluble arsenic compound can be added as such, if an economic source of soluble trivalent iron is available. However, a suitable source of readily soluble trivalent iron is often not available, while a cheap source of iron may be present, especially at a mining site. A common source of iron is pyrite ($FeS_2$) or pyrrhotite (FeS or $Fe_7S_8$). Also oxidation products thereof, such as iron oxides, can be used. Most advantageously, the source of iron is iron scrap, which is usually available at mining sites and other sites where arsenic should be disposed, e.g. in the form of broken or unused equipment, rails, scaffolding or the like.

It is preferred then that the trivalent iron is produced by biological oxidative dissolution of the iron source, using the same bacteria as those assisting in the oxidation of arsenic. The oxidations can be performed simultaneously in the same reactor, but preferably, the generation of trivalent iron in solution is performed in a separate reactor. In the former case, pyrite used for catalysing the arsenic oxidation can be used to provide iron for ferric arsenate precipitation as well.

The precipitation of arsenic in a stable form occurs with an excess of ferric ion resulting in a stable amorphous ferric arsenate. The stability was found to be satisfactory when the Fe/As molar ratio in the precipitate is greater than 4. For a 10 g/l arsenic solution, the precipitation starts at about pH=3. The following reaction may occur:

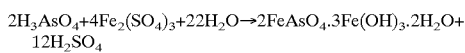
$$2H_3AsO_4 + 4Fe_2(SO_4)_3 + 22H_2O \rightarrow 2FeAsO_4 \cdot 3Fe(OH)_3 \cdot 2H_2O + 12H_2SO_4$$

The overall reaction produces acid. However, the iron source may contain some acid-consuming gangue. Furthermore, the acid production can be reduced by using iron-bearing minerals with lower sulphur levels. When pyrrhotite is used instead of pyrite, the bio-oxidation of the iron-bearing mineral becomes acid-consuming rather than acid-producing.

A preferred option according to the invention is to precipitate the arsenic acid under carefully controlled conditions as crystalline scorodite ($FeAsO_4 \cdot 2H_2O$; Fe/As=1), which considerably reduces the iron requirement and hence the acid production. This requires a molar ratio of iron to arsenic of about 1:1. Thus, the amount of iron added is adjusted such that this ratio is achieved in the precipitation reactor. Preferably between 0.9 and 1.8 mole of iron is used per mole of arsenic present in the arsenic-containing waste to be treated. The net reaction is than as follows:

$$2H_3AsO_4 + Fe_2(SO_4)_3 + 2H_2 \rightarrow 2FeAsO_4 \cdot 2H_2O + 3H_2SO_4$$

When the iron dissolution is assumed to be the rate-limiting step, the kinetics of the overall process rises considerably when less iron is needed. The oxygen requirement will then go down, bringing down both the operational cost and the capital cost.

The precipitation of crystalline scorodite is favoured, although not necessary. It can take place at elevated temperatures (above 80° C.) and at controlled pH (about 2–3, depending on concentrations). As thermophiles can be used for oxidizing both the iron and the arsenic, the invention is also suitable for high-temperature applications.

DETAILED DESCRIPTION OF THE INVENTION

Figure 1:
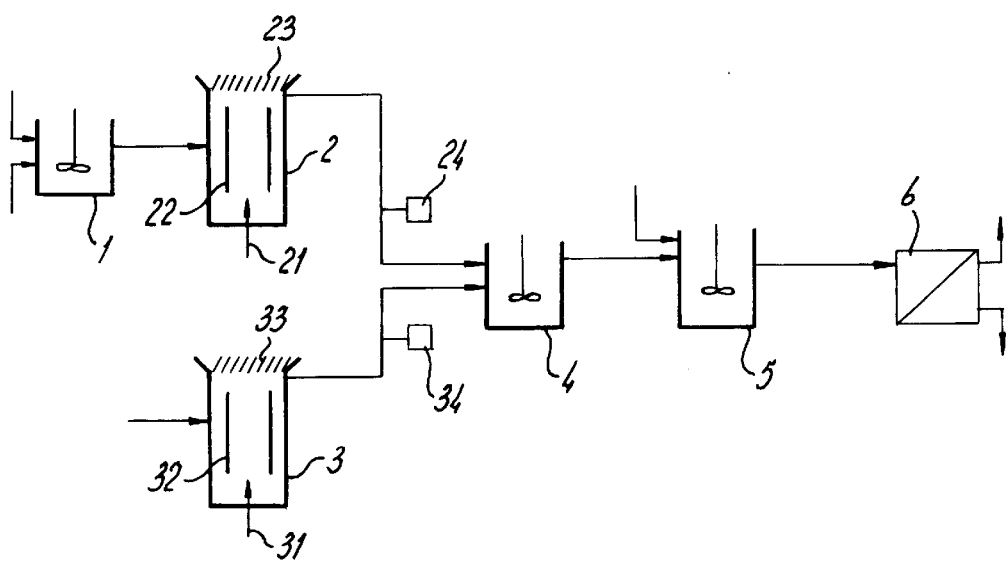
FIGS. 1 and 2 depict suitable installations for carrying out the process of the invention.

The process of the invention can advantageously be carried out in an installation as depicted in the accompanying FIG. 1. According to this figure, the trivalent arsenic waste (e.g. $AS_2O_3$) and the catalyst (e.g. pyrite) are introduced into a mixing tank 1. Means for adjusting the pH to between e.g. 1 and 3 can also be added to tank 1. The mixed liquid is transferred to airlift reactor 2, having an oxygen inlet 21, means for maintaining a vertical recirculation (cylinder) 22, and a plate separator 23 for separating the treated liquid from biomass. A second aerobic (airlift) reactor 3 is fed with an iron source (e.g. pyrite) and also has an oxygen inlet 31, an internal cylinder 32 and a separator 33. Nutrients, including e.g. phosphate and nitrate, may be added to both aerobic reactors 2 and 3. The effluents from reactor 2 and reactor 3 are conducted to a mixing tank 4. The lines between reactors 2 and 3, respectively, and tank 4 may be provided with a metering system 24 and 34, respectively, e.g. a redox indicator, connected to a flow regulator. The effluent of mixing tank 4 is fed to a precipitation tank 5, in which the pH is adjusted to about 4 (using e.g. $CaCO_3$). Instead of distinct tanks 4 and 5, a single mixing/precipitation tank may be used. The solid/liquid mixture from tank 5 is separated in separator 6. The solid precipitate issued from separator 6 is dewatered further and can be deposited. The liquid issuing form separator 6 can be discharged or can be reused e.g. for adjusting the pH in the process.

Figure 2:
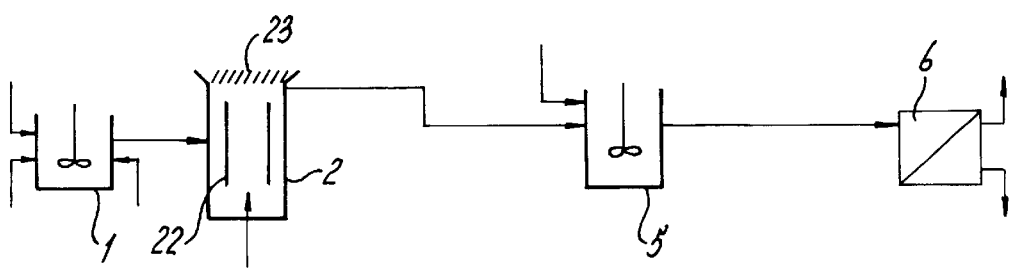

Alternatively, the process of the invention can also be carried out in an installation as depicted in FIG. 2. Similar parts in FIGS. 1 and 2 are referred to by the same numerals. According to this figure, the trivalent arsenic waste (e.g. dissolved arsenite), the catalyst (e.g. pyrite) and the iron source are introduced into the mixing tank 1. Both the oxidation of arsenic and the oxidative dissolution of iron are performed in airlift reactor 2. The further processing can be as described for the installation of FIG. 1.

What is claimed is:

1. A process for removing and immobilizing arsenic from an arsenic-containing waste comprising:

(a) oxidizing the arsenic to pentavalent arsenic in an aqueous medium using oxidizing bacteria at a pH between 0.5 and 4 and at a temperature between 20 and 90° C. in the presence of a mineral catalyst;

(b) adding to the arsenic between 0.9 and 1.8 mole of iron per mole of arsenic, the iron being trivalent iron or being oxidized to trivalent iron, and allowing said pentavalent arsenic and said trivalent iron to form a crystalline scorodite ($FeAsO_4 \cdot 2H_2O$) precipitate at a pH between 0.5 and 4; and (c) continuously separating precipitated scorodite from the aqueous medium.

2. The process according to claim 1, wherein the iron is oxidized to trivalent iron by oxidative dissolution of an iron source using oxidizing bacteria.

3. The process according to claim 2, wherein the oxidation of the iron is carried out separately from the oxidation of the arsenic.

4. The process according to claim 2, wherein the iron source comprises pyrite ($FeS_2$) or pyrrhotite (FeS) or an oxidation product thereof.

5. The process according to claim 1, wherein the trivalent iron is obtained by oxidation of iron scrap.

6. The process according to claim 1, wherein about 1 mole of trivalent iron is added per mole of arsenic.

7. The process according to claim 1, wherein the mineral catalyst is a sulfur-containing catalyst selected from the group consisting of pyrite ($FeS_2$), chalcopyrite ($CuFeS_2$) and molydenite ($MoS_2$).

8. The process according to claim 1, wherein the oxidation of arsenic is carried out at a temperature between 30 and 45° C.

9. The process according to claim 1, wherein the oxidizing bacteria comprise mesophilic bacteria of the species *Thiobacillus ferrooxidans, T. thiooxidans* and/or *Leptospirillum ferrooxidans*.

10. The process according to claim 1, wherein the oxidation of arsenic is carried out at a temperature between 45 and 65° C.

11. The process according to claim 10, wherein the oxidizing bacteria comprise thermophilic bacteria of the genera Acidomicrobium, Sulfobacillus and/or Thiobacillus.

12. The process according to claim 1, wherein the oxidation of arsenic is carried out at a temperature between 65 and 90° C.

13. The process according to claim 12, wherein the oxidizing bacteria comprise thermophilic bacteria of the genera Sulpholobus and/or Acidianus.

14. The process according to claim 13, wherein the oxidizing bacteria comprise thermophilic bacteria of the species *S. acidocaldarius*.

15. The process according to claim 1, wherein the oxidation of the arsenic is carried out in an air-lift reactor.

16. The process according to claim 1, wherein the crystalline scorodite is allowed to form at a pH between 2 and 3.

* * * * *